United States Patent
Kondo et al.

(10) Patent No.: US 6,931,472 B1
(45) Date of Patent: Aug. 16, 2005

(54) INTEGRATED CIRCUIT AND INFORMATION PROCESSING DEVICE

(75) Inventors: Nobukazu Kondo, Kawasaki (JP); Kei Suzuki, Kokubunji (JP); Kouki Noguchi, Kodaira (JP); Itaru Nonomura, Kawasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/763,438

(22) PCT Filed: Feb. 14, 2000

(86) PCT No.: PCT/JP00/00793

§ 371 (c)(1),
(2), (4) Date: Nov. 8, 2001

(87) PCT Pub. No.: WO00/51005

PCT Pub. Date: Aug. 31, 2000

(30) Foreign Application Priority Data

Feb. 23, 1999  (JP) .......................... 11-044133

(51) Int. Cl.[7] .............................. G06F 13/36
(52) U.S. Cl. ...................... 710/310; 710/317
(58) Field of Search ................ 710/305, 306, 710/310, 311, 313, 314, 316, 317, 260; 716/14; 370/380

(56) References Cited

U.S. PATENT DOCUMENTS

| | | | |
|---|---|---|---|
| 5,309,561 A | | 5/1994 | Overhouse et al. |
| 5,761,516 A | | 6/1998 | Rostoker et al. |
| 5,968,155 A | * | 10/1999 | Davidson ................. 710/305 |
| 6,018,782 A | * | 1/2000 | Hartmann ................ 710/310 |
| 6,275,975 B1 | * | 8/2001 | Lambrecht et al. ......... 716/14 |
| 6,353,867 B1 | * | 3/2002 | Qureshi et al. ........... 710/305 |
| 6,597,692 B1 | * | 7/2003 | Venkitakrishnan ......... 370/380 |
| 6,601,126 B1 | * | 7/2003 | Zaidi et al. .............. 710/305 |

FOREIGN PATENT DOCUMENTS

| | | |
|---|---|---|
| JP | 8185371 | 7/1996 |
| JP | 10063614 | 3/1998 |

* cited by examiner

*Primary Examiner*—Khanh Dang
(74) *Attorney, Agent, or Firm*—Antonelli, Terry, Stout & Kraas, LLP

(57) ABSTRACT

In an LSI system using an on-chip bus, when a transfer on the bus is delayed due to a fully loaded buffer in a destination module, a source module cannot proceed to the next processing. Such an unwanted situation is eliminated by a transferring buffer which is provided on a transfer path in an on-chip bus on the LSI for temporarily storing transfer data. With this transferring buffer, even if a buffer within a slave module, specified as the destination, is fully loaded and cannot accept any more transfer, a bus master can transfer data to the transferring buffer provided on the on-chip bus. Thus, the bus master is not kept waiting for execution of a transfer, irrespective of the state of the buffer within the slave, thereby improving the processing performance of the entire system.

13 Claims, 14 Drawing Sheets

INTEGRATED CIRCUIT AND INFORMATION PROCESSING DEVICE

TECHNICAL FIELD

The present invention relates to the LSI technologies employed for components of an information processing apparatus, a typical example of which is a personal computer or a workstation. In particular, it relates to the configuration of an internal bus of a LSI device (hereinafter "LSI") and a method of controlling the bus. Here, the type of LSI being referred to is a kind of LSI that is configured by integrating, on a single chip, a plurality of functions such as a processor, a memory and various types of peripheral function modules.

BACKGROUND ART

A representative example of a conventional technology concerning a bus and its controlling method used in the information processing apparatus, such as a personal computer or a workstation, is shown in JP-A-5-324544. This conventional method of controlling the bus will be explained below, using FIG. 8. At present, due to the ease with which the interface circuit can be designed, a synchronous-type bus has become the mainstream device for such use. With respect to such a synchronous-type bus, a plurality of modules connected to the synchronous-type bus execute transmitting/receiving control of data in synchronization with a system clock, i.e., a clock that is common to the respective modules.

Taking as an example a burst write operation with a 4-data cycle and explaining the transferring system of the conventional synchronous-type bus, the explanation can be illustrated in FIG. 8. FIG. 8 is a burst write timing chart of a conventional bus arrangement(in which the transfer destination module-side buffer is in an empty state). In FIG. 8, the reference numerals denote the following signals, respectively: 801 a system clock signal with which a transfer should be performed in synchronization, 802 an address/data (A/D) signal for transmitting address/data from a transfer source module (bus master) to the transfer destination module (slave) through a bus module, 803 an address-valid (ADV-N) signal for indicating a valid time-period of an address/command, 804 a data-valid (DTV-N) signal for indicating a valid time-period of the data, 805 a command (CMD) signal for specifying information such as the type of the transfer, 806 an acknowledge (ACK-N) signal with which the bus module acknowledges the transfer source module (bus master) that the bus module has accepted the transfer, 807 a retry requesting (RTY-N) signal with which the transfer destination module (slave) requests the transfer source module (bus master) to execute the transfer once again at a later time since a buffer within the transfer destination module has been fully occupied and is now in a state of being unable to accept the transfer.

The bus master, i.e., the transfer source, sends out the transfer address and the transfer command onto the bus in synchronism with the system clock 801. At this time, by asserting the address-valid signal 803, the bus master specifies that the transfer is an address/command cycle. Next, through the acknowledge signal clock 806, the slave module, i.e., the transfer destination, informs the bus master of a report that the slave module has actually received the address/command cycle. Having received the report, the bus master sends out data onto the bus, utilizing continuous 4-data cycles in synchronism with the system 801, thereby terminating the data transfer. At this time, by using the data-valid signal 804, the bus master specifies that the transfer is a data cycle.

Meanwhile, in recent years, the integration scale of LSI devices has been steadily increasing. As a result, it is now becoming possible to integrate, all together on a single chip, a plurality of functions constituting the system, such as a processor, a memory and various types of peripheral function modules. In this case, it can be considered that the above-described bus should be installed inside the LSI as an on-chip bus. Some advantages of providing the bus inside the LSI are that it is possible to make the interface circuit common to the respective modules, it is possible to make it easier to divert and employ the various types of function modules into the other LSIs, and so on.

U.S. Pat. No. 5,761,516 has disclosed a conventional example in which a bus has been installed inside an LSI as a on-chip bus.

In general, in a system where a bus such as described above is used, a buffer which is fully occupied within the transfer destination module causes a waiting state on the bus. This results in a problem that the system performance will be deteriorated. FIG. 9 provides an illustration of such a waiting state with a burst write over 4 data cycles, as an example.

FIG. 9 is a timing chart for a burst write operation on a conventional bus (in which the transfer destination module-side buffer is in a full state). In FIG. 9, the reference numerals denote the following signals, respectively: 901 a system clock signal with which a transfer should be performed in synchronization, 902 an address/data (A/D) signal for transmitting address/data from a transfer source module (bus master) to the transfer destination module (slave) through a bus module, 903 an address-valid (ADV-N) signal for indicating a valid time-period of an address/command, 904 a data-valid (DTV-N) signal for indicating a valid time-period of the data, 905 a command (CMD) signal for specifying information such as the type of the transfer, 906 an acknowledge (ACK-N) signal with which the bus module acknowledges to the transfer source module (bus master) that the bus module has accepted the transfer, and 907 a retry requesting (RTY-N) signal with which the transfer destination module (slave) requests the transfer source module (bus master) to execute the transfer once again at a later time since a buffer within the transfer destination module has been fully occupied and is now in a state of being unable to accept the transfer. The bus master, i.e., the transfer source, sends out a transfer address and a transfer command onto the bus in synchronism with the system clock 901. At this time, by asserting the address-valid signal 903, the bus master specifies that the transfer is an address/command cycle.

Here, when the buffer within the slave module, that is, the transfer destination, has been fully occupied and is in the state of being unable to receive anymore data, the slave module, using the retry requesting (RTY-N) signal 907, requests the bus master to execute the transfer once again at a later time. After the lapse of a fixed time interval, the bus master starts the transfer on the bus again. At this time, if the buffer within the slave module, that is, the transfer destination, has not been fully occupied, after receiving a report of the transfer acknowledgement from the slave module (that is, no retry request is received), the bus master executes a transfer of a burst write operation over 4 data cycles, thereby terminating the data transfer. In this case, the bus is equipped with a retry protocol, and, accordingly, the bus master is not kept waiting while occupying the bus, thus causing no disturbance to the other transfers. During at least the above-described fixed time interval, however, the transfer destination module never accepts the data transfer from the transfer source module that has already received the retry request. Consequently, there still remains the problem that the transfer source module is incapable of proceeding to the subsequent process.

In an LSI system where the on-chip bus is employed, depending on the buffer state in the transfer destination module, the bus transfer is kept waiting. This results in a situation that it becomes impossible for the transfer source module to proceed to the next process for the bus transfer. An object of the present invention is to prevent this situation.

DISCLOSURE OF THE INVENTION

According to the present invention, on a transfer path of an on-chip bus on an LSI, a transferring buffer and a controlling unit are provided such that, during a data transfer, the devices can be in common use among respective modules connected to the on-chip bus.

Even if the buffer in a slave module, that is the transfer destination, has been fully occupied and is in the state of being unable to receive anymore data, the above-described bus master can temporarily transfer the data to the transferring buffer. Here, the transferring buffer can be in common use among the respective modules located on the on-chip bus on the LSI. Consequently, the bus master becomes capable of proceeding to the next process. On account of this, the possibility is eliminated that, depending on the state of the buffer on the slave module (transfer destination) side, the bus master is kept waiting to execute the data transfer. This condition enhances the total processing performance of the system.

BEST MODE FOR CARRYING OUT THE INVENTION

Referring to FIGS. 1 to 12, an explanation will be given below concerning embodiments of the present invention.

Figure 1:
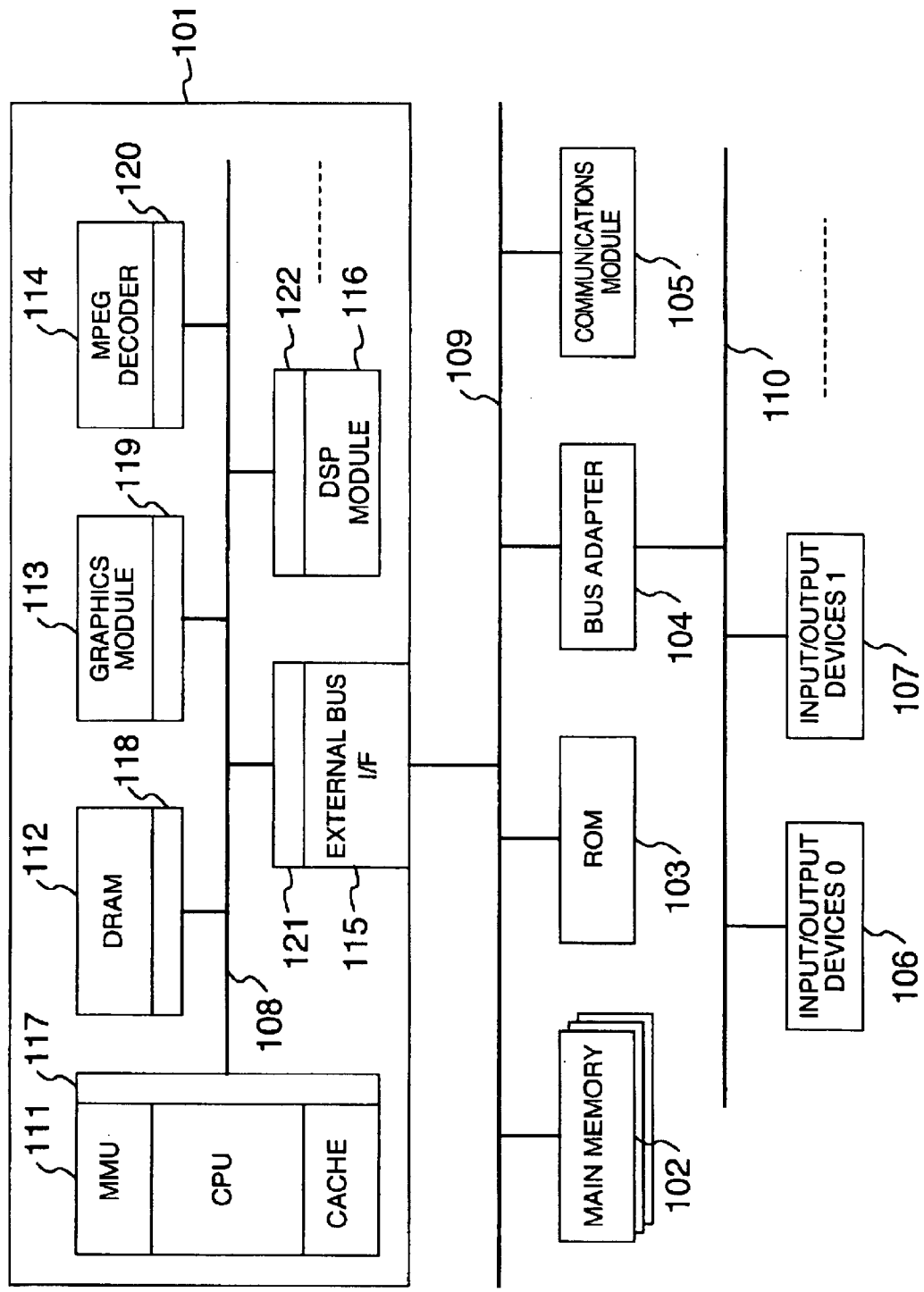
FIG. 1 is a block diagram of an information processing apparatus in which a system LSI is used that employs an on-chip bus according to the present invention.

FIG. 1 is a block diagram of an information processing apparatus in which a system LSI is used that employs an on-chip bus according to the present invention.

Figure 2:
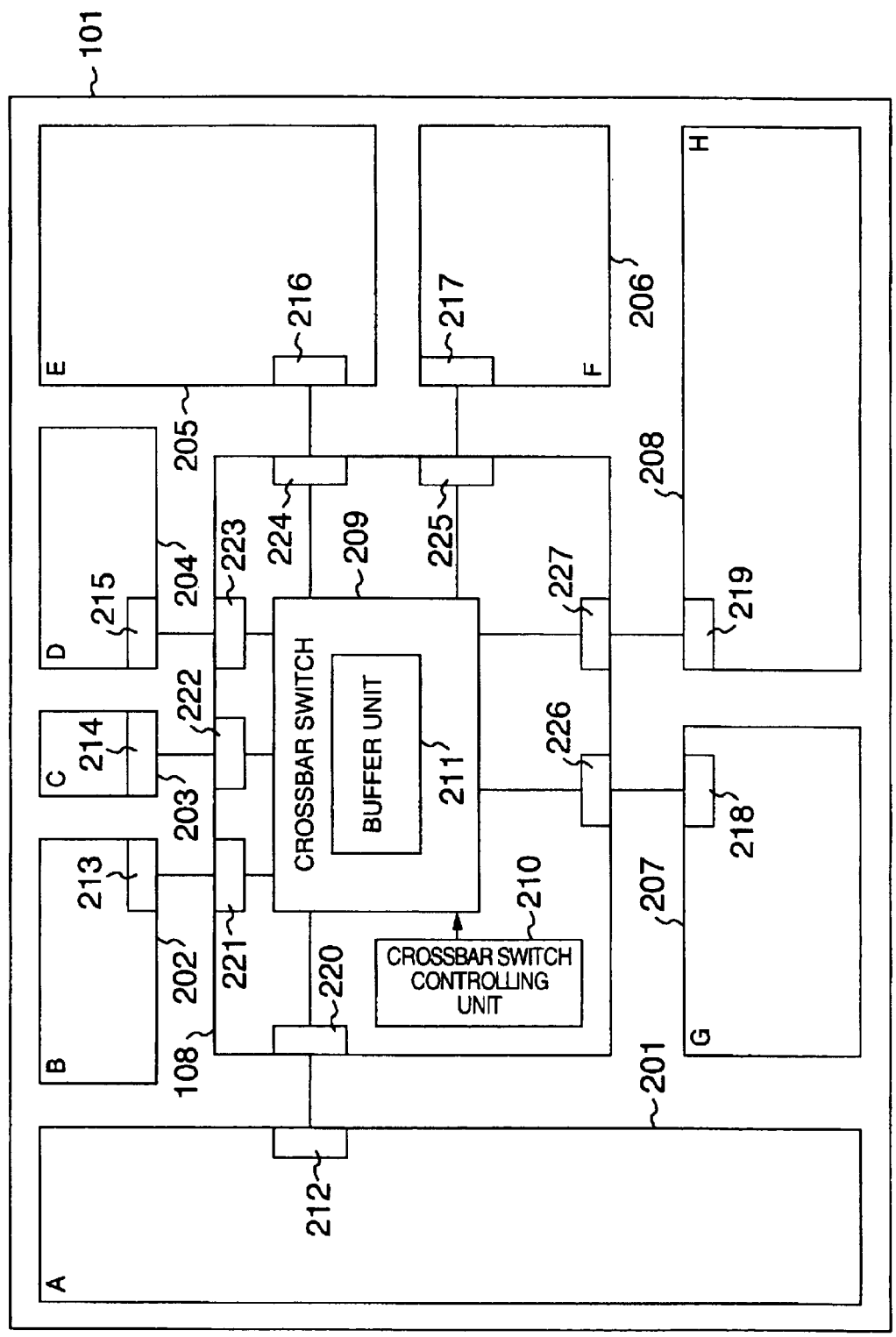
FIG. 2 is a block diagram of a system LSI employing an on-chip bus according to the present invention.

FIG. 2 is a block diagram of the system LSI employing the on-chip bus according to the present invention.

Figure 3:
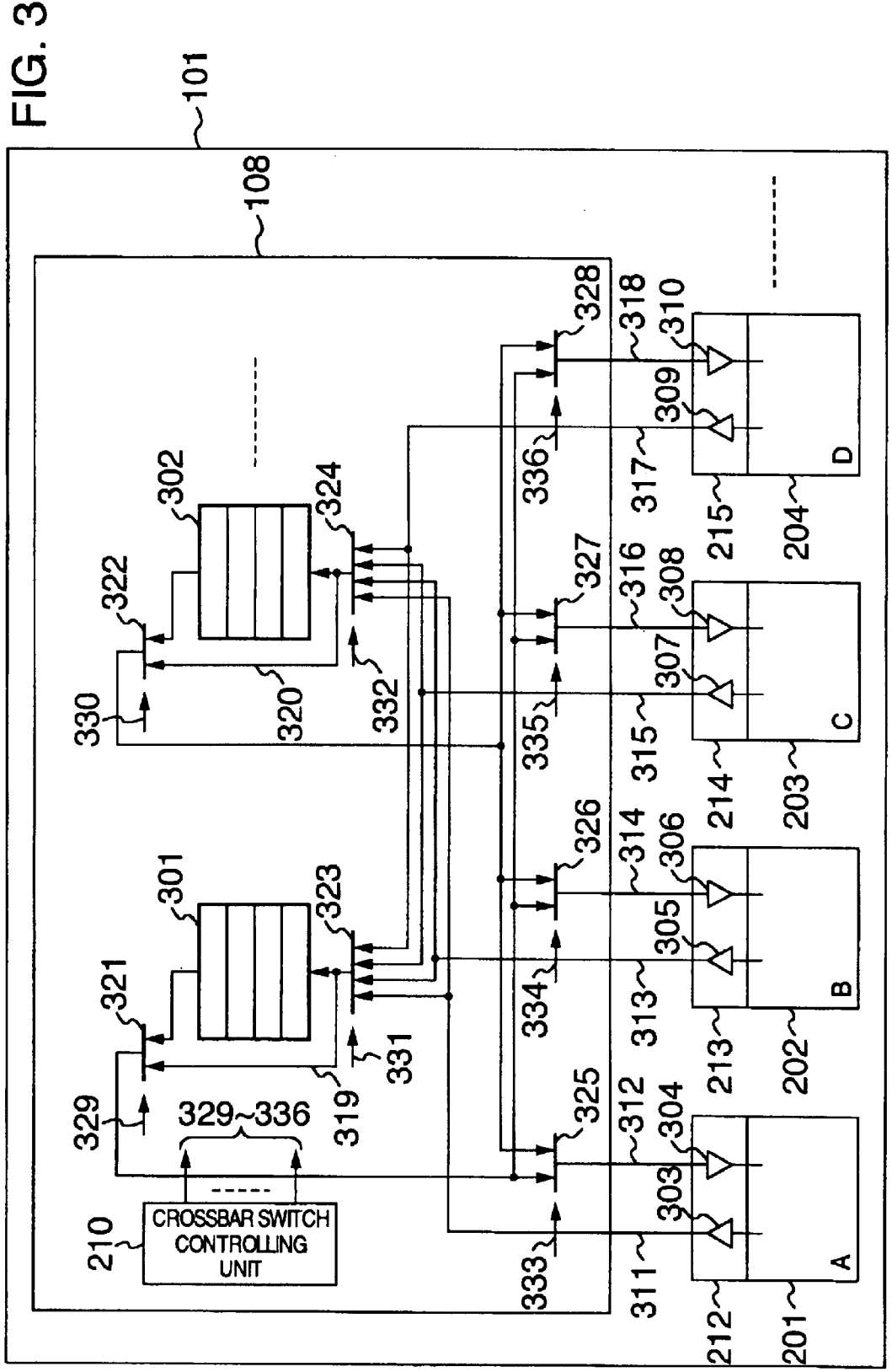
FIG. 3 is a block diagram for illustrating an internal configuration of a system LSI employing a on-chip bus according to the present invention.
Figure 4:
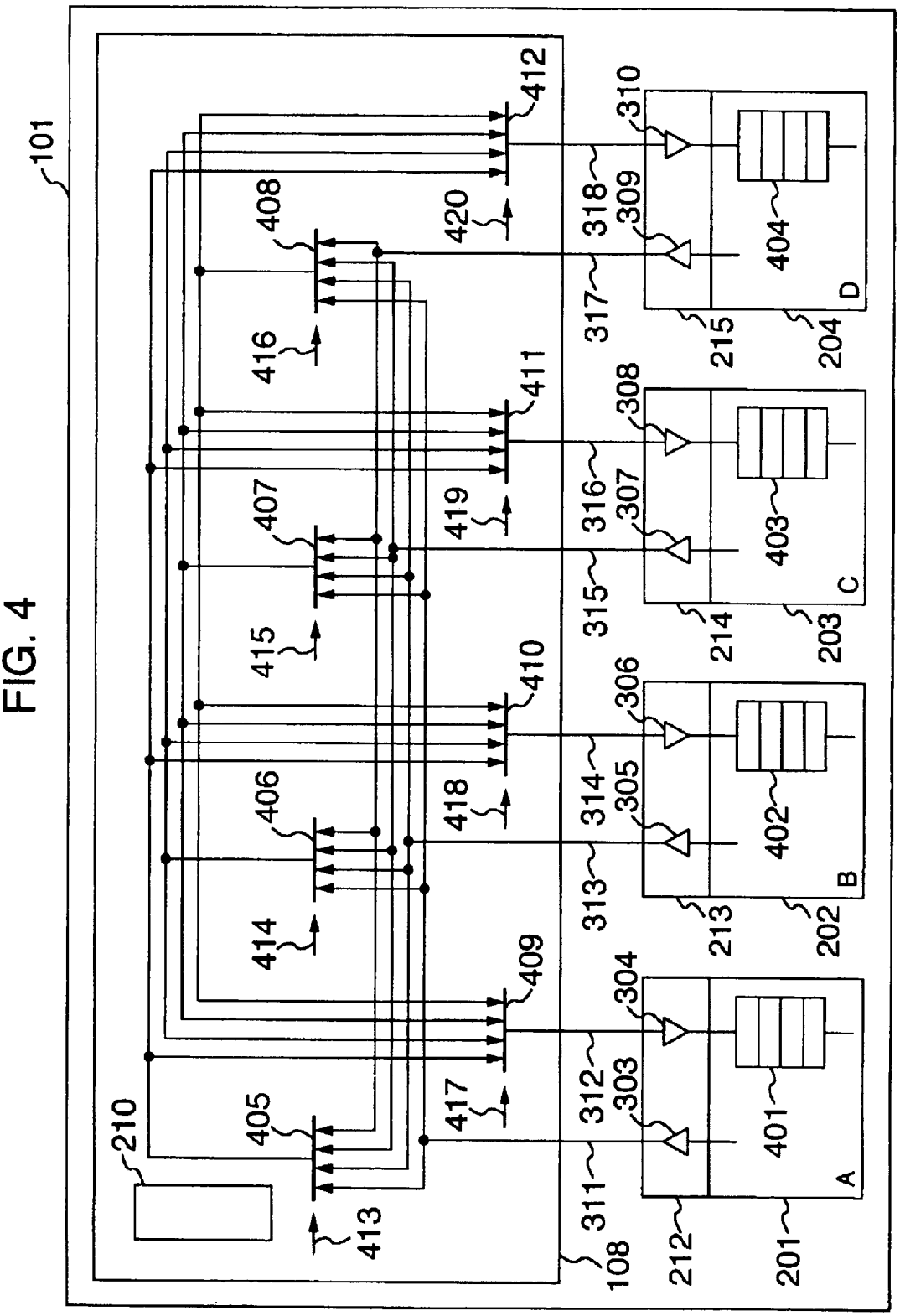
FIG. 4 is a block diagram for illustrating an internal configuration of a system LSI in which a bus configuration that uses an off-chip crossbar switch is implemented on-chip.

FIG. 3 is a block diagram for illustrating an internal configuration of a system LSI employing the on-chip bus according to the present invention. ¥ FIG. 4 is a block diagram for illustrating an internal configuration of a system LSI in which a bus configuration that uses an off-chip crossbar switch is implemented on-chip.

Figure 5:
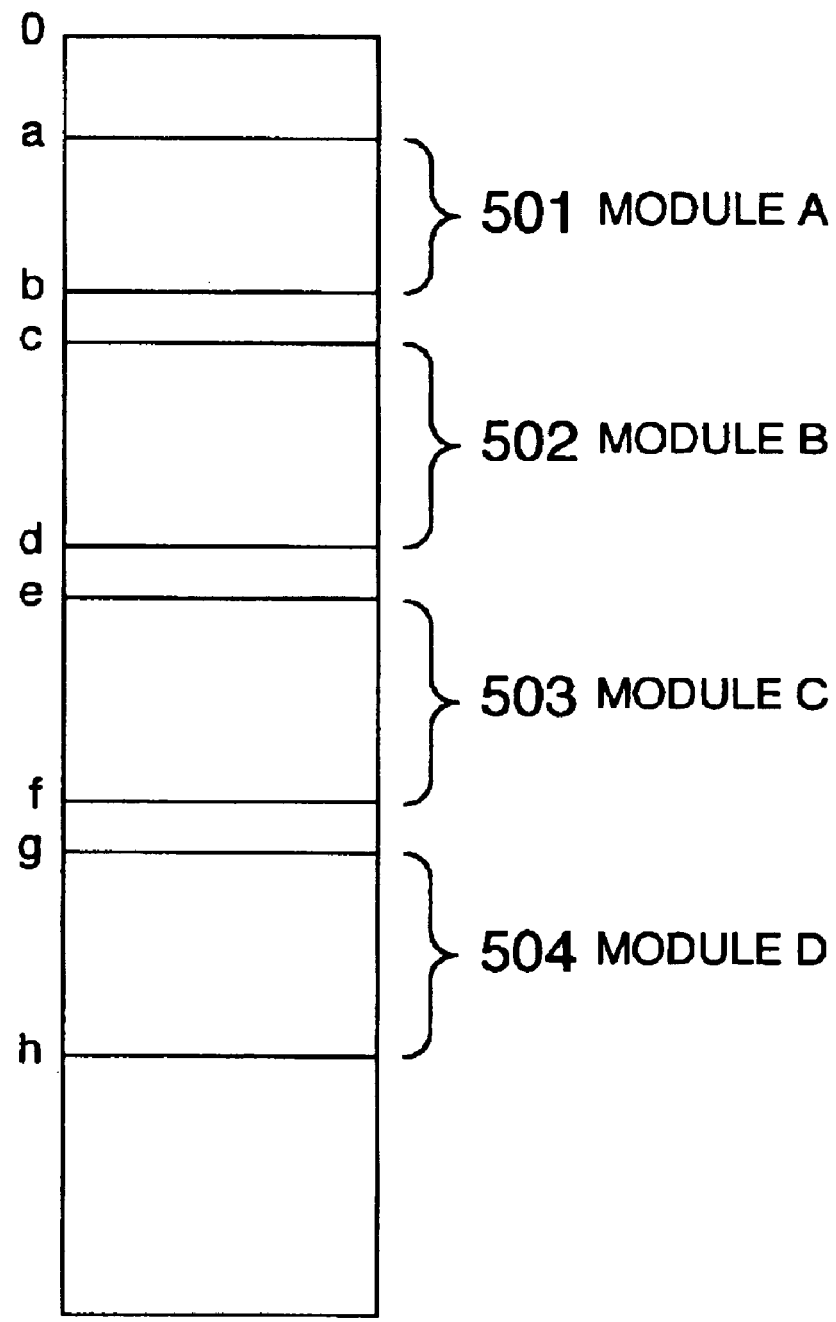
FIG. 5 is an address space map for indicating address allocation of the on-chip bus according to the present invention.

FIG. 5 is an address space map for indicating address allocation of the on-chip bus according to the present invention.

Figure 6:
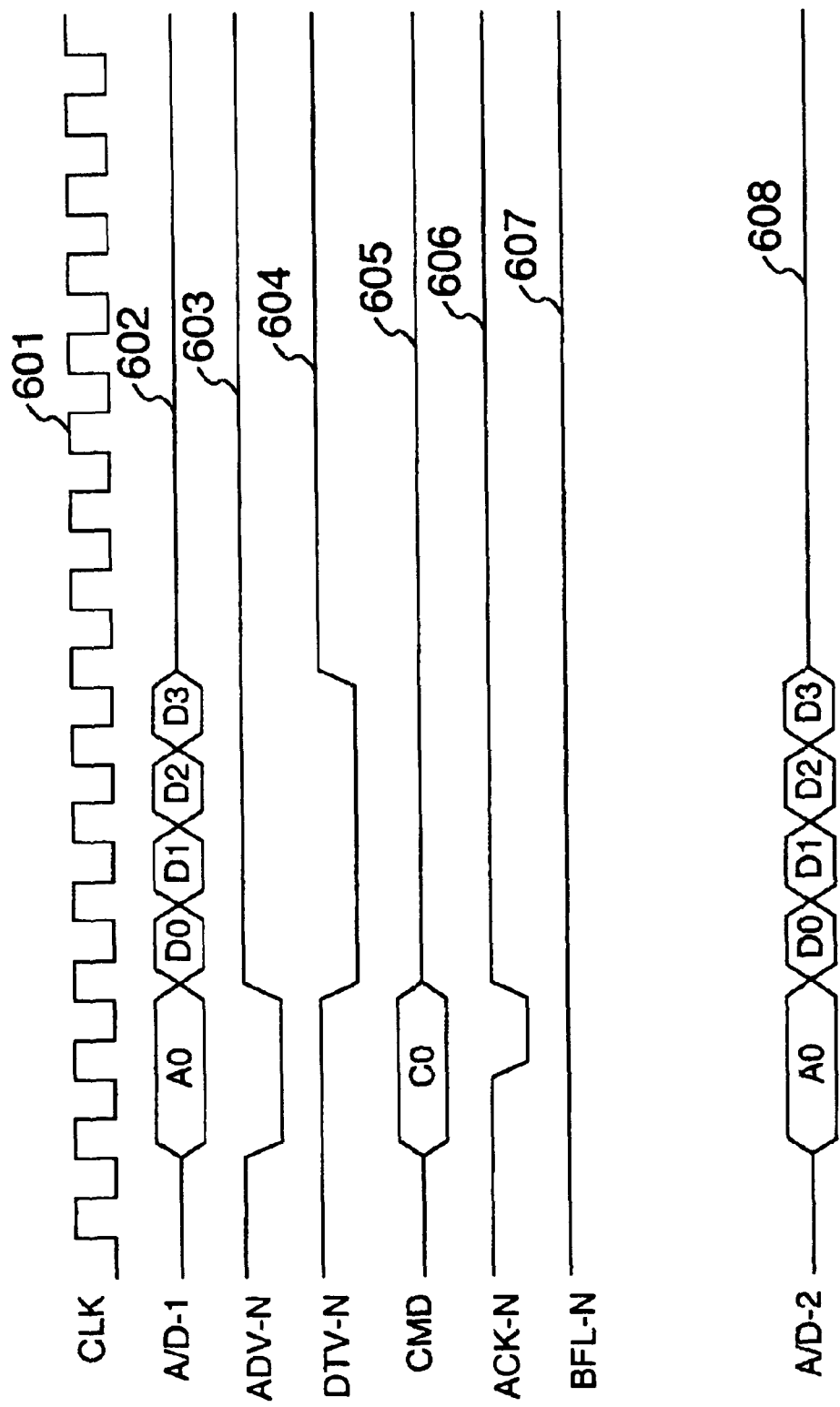
FIG. 6 is a burst write timing chart of the on-chip bus according to the present invention (with the receiving side buffer in an empty state)

FIG. 6 is a burst write timing chart of the on-chip bus according to the present invention (with the receiving side buffer in an empty state).

Figure 7:
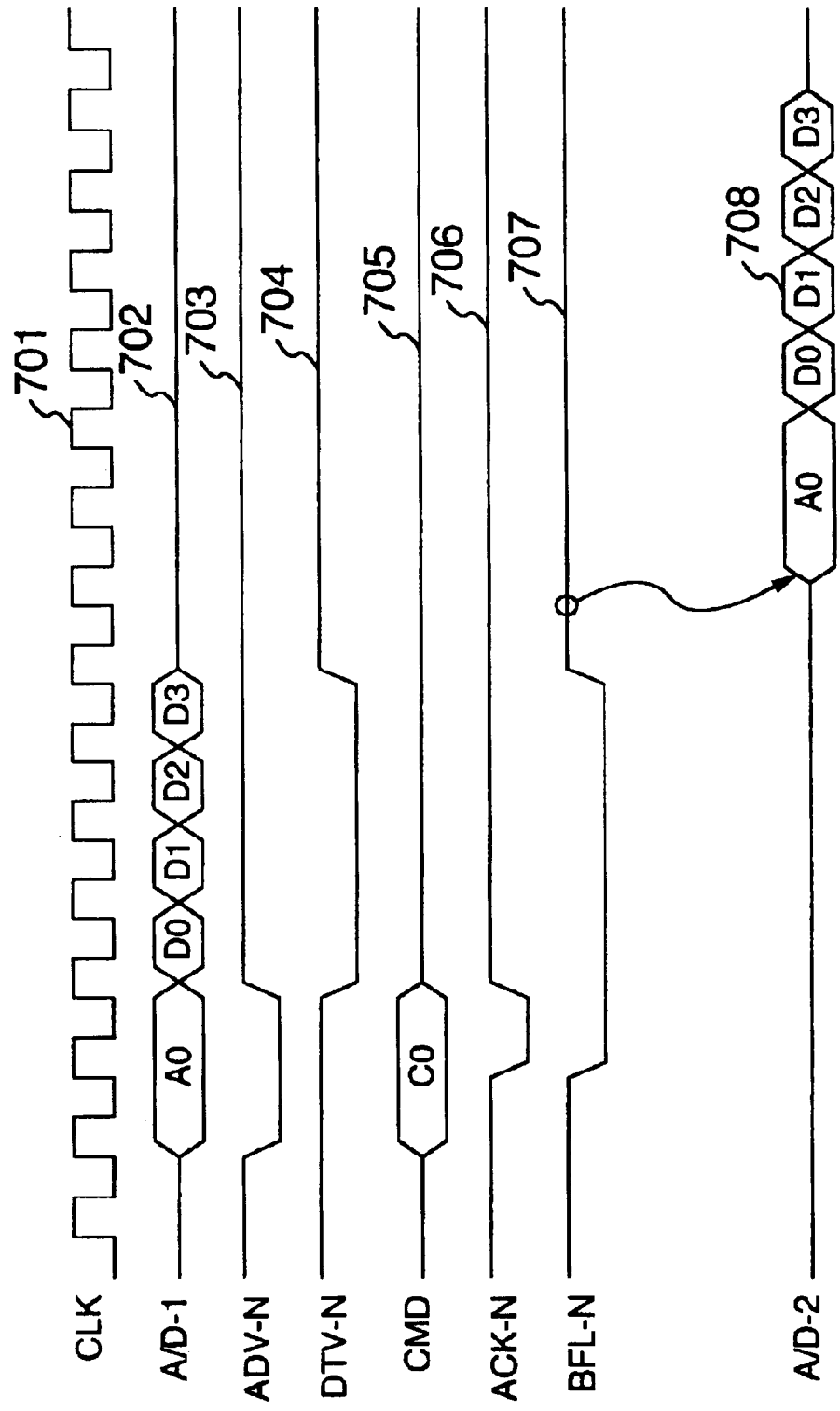
FIG. 7 is a timing chart for a burst write on the on-chip bus according to the present invention (with the receiving side buffer in a full state)

FIG. 7 is a burst write timing chart of the on-chip bus according to the present invention (with the receiving side buffer in a full state).

Figure 10:
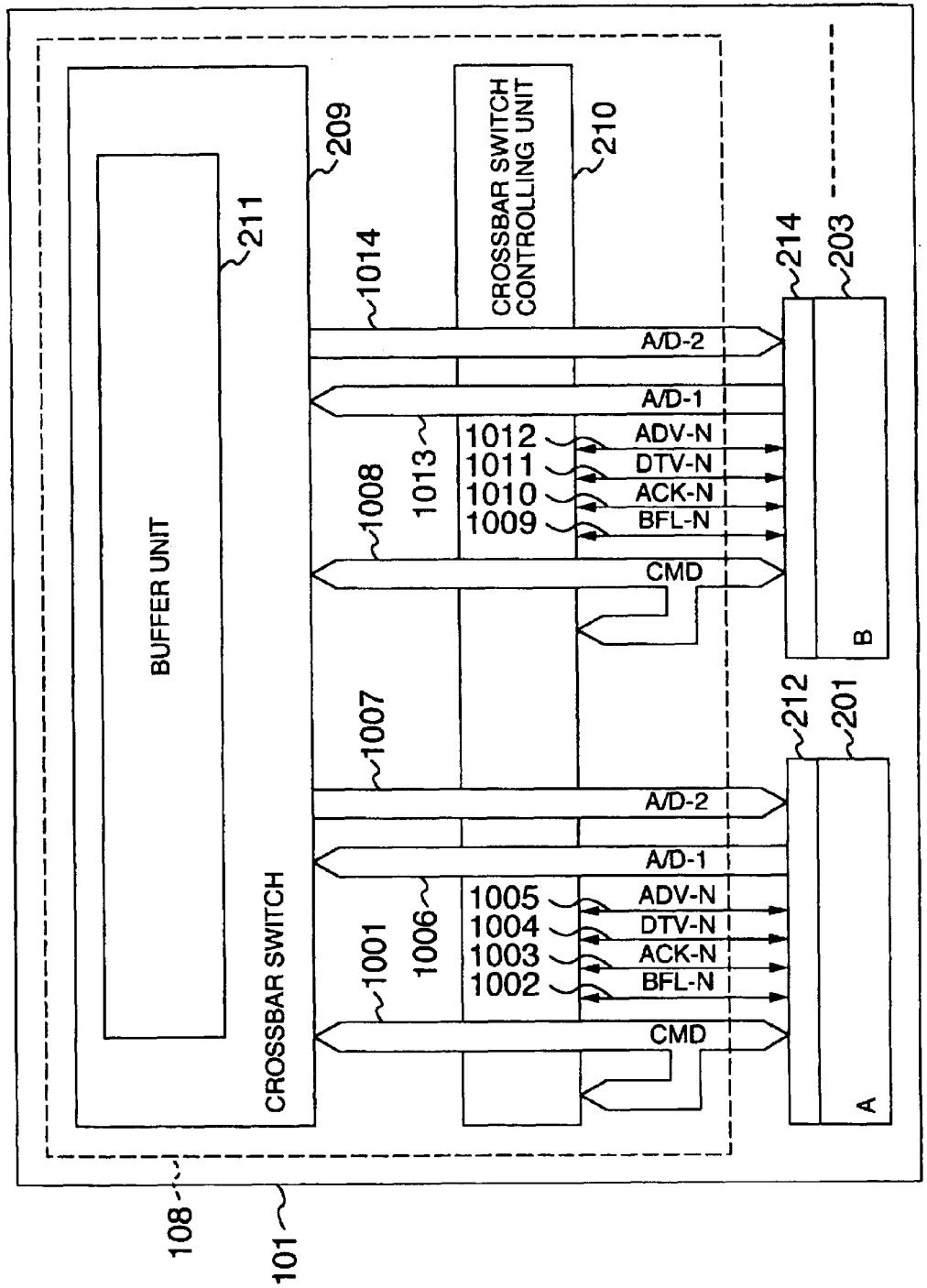
FIG. 10 is a connection diagram for illustrating a line connection relationship of the on-chip bus according to the present invention.

FIG. 10 is a connection diagram for illustrating a line connection relationship of the on-chip bus according to the present invention.

Figure 11:
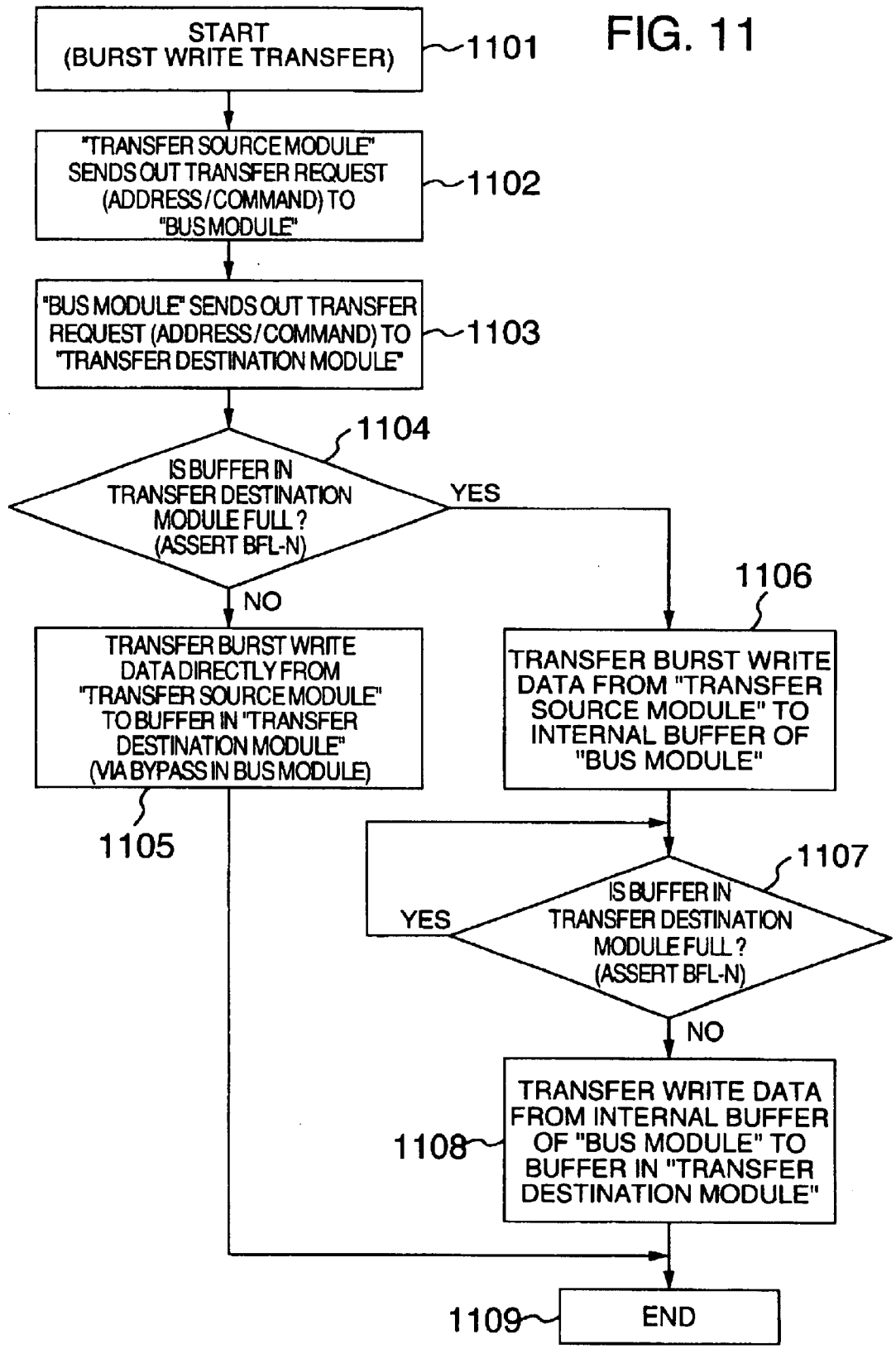
FIG. 11 is a flow chart for indicating a transfer procedure on the on-chip bus according to the present invention.

FIG. 11 is a flow chart for indicating a transfer procedure on the on-chip bus according to the present invention.

Figure 12:
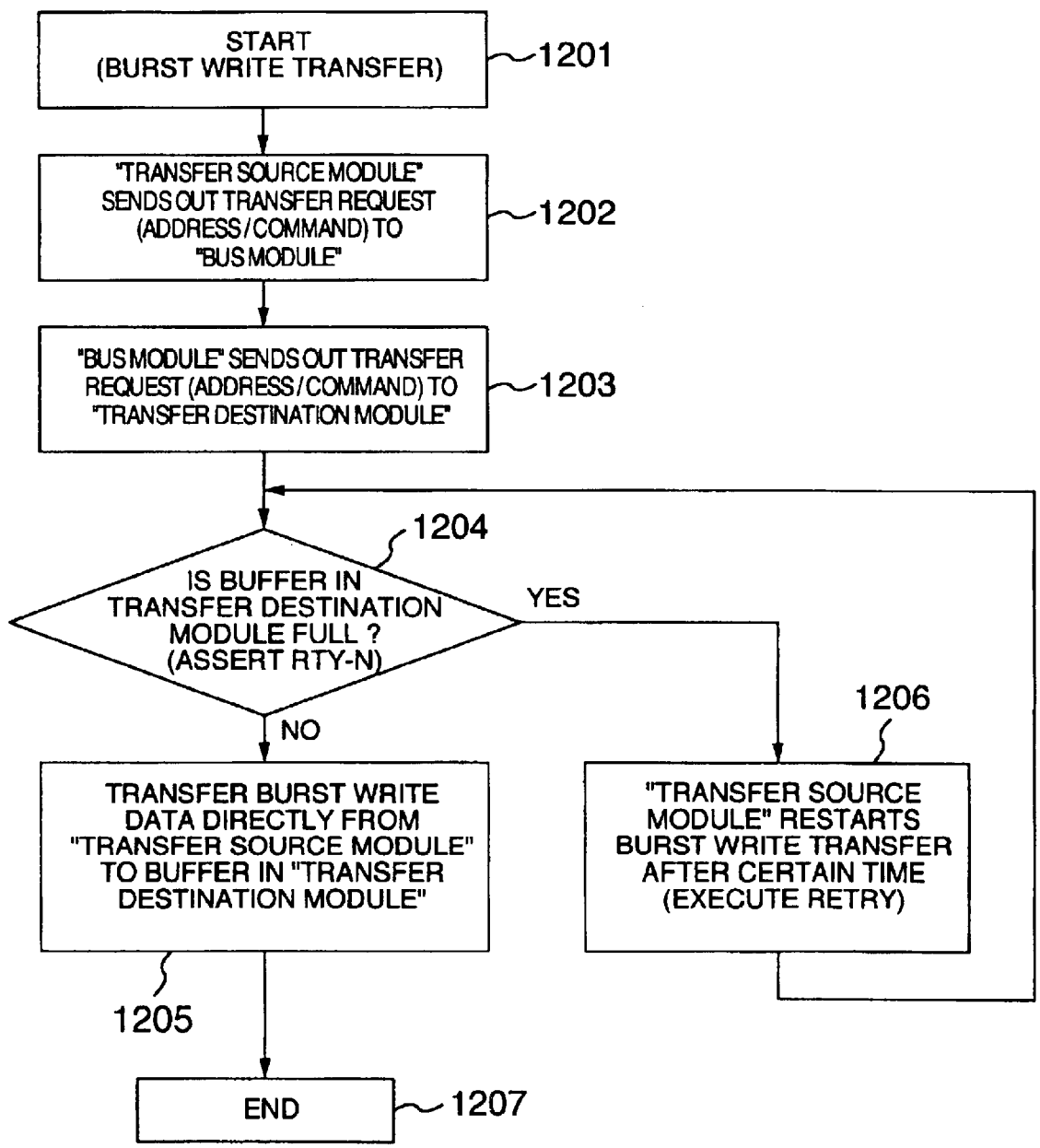
FIG. 12 is a flow chart for indicating a transfer procedure on a conventional on-chip bus.

FIG. 12 is a flow chart for indicating a transfer procedure on the conventional on-chip bus.

In FIG. 1, the reference numerals denote the following components, respectively: 101 a system LSI employing an on-chip bus according to the present invention, 102 a main memory device, 103 a ROM, 104 a bus adapter for executing a protocol conversion between a system bus 109 and an I/O bus 110, 105 a communications module, 106, 107 input/output devices, 108 the on-chip bus, 109 the system bus, 110 the I/O bus, 111 a CPU module including a memory management unit (MMU) and a cache memory, 112 an on-chip DRAM module, 113 a graphics module, 114 a MPEG (Moving Picture Experts Group) decoder module, 115 an external bus (the system bus) interface module, and 116 a DSP (Digital Signal Processor) module. Also, units 117 to 122 are common interface units to which the on-chip bus 108 is common.

In FIG. 2, the reference numerals denote the following components, respectively: 201 a module A, 202 a module B, 203 a module C, 204 a module D, 205 a module E, 206 a module F, 207 a module G, 208 a module H (Noting that these are all modules located inside the system LSI), 209 a crossbar switch unit of the on-chip bus, 210 a crossbar switch controlling unit, and 211 a buffer unit provided inside the crossbar switch. Also, units 212 to 219 are on-chip bus interface units of the modules A to H, respectively. Moreover, units 220 to 227 are module interface units of the on-chip bus.

In FIG. 3, the reference numerals denote the following components: 301, 302 transferring buffers provided on transfer paths within a bus module 108, 303, 305, 307, 309 data output buffers of the modules A, B, C, D, respectively, 304, 306, 308, 310 data input buffers of the modules A, B, C, D, respectively, 311, 313, 315, 317 data outputting lines from the modules A, B, C, D, respectively, 312, 314, 316, 318 data inputting lines into the modules A, B, C, D, respectively, 319 a bypass line for bypassing the buffer 301, 320 a bypass line for bypassing the buffer 302, 321 to 328 selectors constituting the crossbar switch, and 329 to 336 control lines from the crossbar switch controlling unit 210 for determining a path for data. As illustrated in FIG. 3, with the provision of the plurality of transferring buffers that are shared among the modules, input/output operations associated with the transferring buffers can be performed in parallel.

In FIG. 4, the reference numerals denote the following components: 401, 402, 403, 404 input data buffers of the modules A, B, C, D, respectively, 405 to 412 selectors constituting the crossbar switch, and 413 to 420 control lines from the crossbar switch controlling unit 210 for determining a path of data.

In FIG. 5, the reference numerals denote the following address spaces, respectively: 501 an address space of the module A, 502 an address space of the module B, 503 an address space of the module C, and 504 an address space of the module D.

In FIG. 6, the reference numerals denote the following signals, respectively: 601 a system clock signal with which a transfer should be performed in synchronization, 602 an address/data (A/D-1) signal for transmitting address/data from the transfer source module (bus master) to the bus module 108, 603 an address-valid (ADV-N) signal for indicating a valid time-period of an address/command, 604 a data-valid (DTV-N) signal for indicating a valid time-period of the data, 605 a command (CMD) signal for specifying information such as the type of the transfer, 606 an acknowledge (ACK-N) signal with which the bus module 108 acknowledges to the transfer source module (bus master) that the bus module 108 has accepted the transfer, 607 a buffer-full (BFL-N) signal with which the transfer destination module (slave) informs the bus module 108 that a buffer within the transfer destination module has been fully occupied and is now in a state of being unable to accept the transfer, and 608 an address/data (A/D-2) signal for transmitting address/data from the bus module 108 to the transfer destination module (slave).

In FIG. 7, the reference numerals denote the following signals, respectively: 701 a system clock signal with which a transfer should be performed in synchronization, 702 an address/data (A/D-1) signal for transmitting address/data from the transfer source module (bus master) to the bus module 108, 703 an address-valid (ADV-N) signal for indicating a valid time-period of an address/command, 704 a data-valid (DTV-N) signal for indicating a valid time-period of the data, 705 a command (CMD) signal for specifying information such as the type of transfer, 706 an acknowledge (ACK-N) signal with which the bus module 108 acknowledges to the transfer source module (bus master) that the bus module 108 has accepted the transfer, 707 a buffer-full (BFL-N) signal with which the transfer destination module (slave) informs the bus module 108 that a buffer within the transfer destination module has been fully occupied and is now in a state of being unable to accept the transfer, and 708 an address/data (A/D-2) signal for transmitting address/data from the bus module 108 to the transfer destination module (slave).

In FIG. 10, the reference numerals denote the following signals, respectively: 1001 the command signal between the module A and the bus module 108, 1002 the buffer-full signal between the module A and the bus module 108, 1003 the acknowledge signal between the module A and the bus module 108, 1004 the data-valid signal between the module A and the bus module 108, 1005 the address-valid signal between the module A and the bus module 108, 1006 the address/data signal from the module A to the bus module 108, 1007 the address/data signal from the bus module 108 to the module A, 1008 the command signal between the module B and the bus module 108, 1009 the buffer-full signal between the module B and the bus module 108, 1010 the acknowledge signal between the module B and the bus module 108, 1011 the data-valid signal between the module B and the bus module 108, 1012 the address-valid signal between the module B and the bus module 108, 1013 the address/data signal from the module B to the bus module 108, and 1014 the address/data signal from the bus module 108 to the module B.

First, an explanation will be given below concerning the system configuration. FIG. 1 is a block diagram of an information processing apparatus in which a system LSI is used that employs a on-chip bus according to the present invention. The system bus 109 is connected to the system LSI (i.e., a processor on which the peripheral function modules are built-in) that employs the on-chip bus according to the present invention, a main memory device 102, a ROM 103 and a communications module 105. Moreover, the plurality of input/output devices 106, 107 are connected to the I/O bus 110 that is connected to the system bus 109 through the bus adapter 104. The respective modules located inside the system LSI, such as the CPU module, the DRAM module and the graphics module, have common interface units (117 to 122 and so on) and are all connected to the on-chip bus 108. A block diagram illustrating the internal configuration of the system LSI 101 is provided in FIG. 2.

The on-chip bus inside the system LSI in the present embodiment is formed with a crossbar switch configuration including a plurality of selectors. In addition, inside the crossbar switch configuration, transferring buffers are provided that the respective modules connected to the on-chip bus can use in common during a transfer of the data and so on. Here, these (including the crossbar switch controlling unit 210) are collectively referred to as the bus module 108. Moreover, here, the crossbar switch has a function of selecting one output from one or more of the inputs. The bus module includes the crossbar switch controlling unit 210 for controlling transfer paths of the crossbar switch and a transfer timing thereof. A block diagram illustrating the flow of the data inside the bus module 108 is provided in FIG. 3.

Also, since the on-chip bus in the present invention is of the crossbar switch configuration, the address spaces are allocated to the respective modules in advance, as illustrated in FIG. 5. Here, let's consider the case where, in FIG. 3, the module A (201) executes a transfer of a burst write (over 4 data cycles) toward the module C (203). As indicated in the timing chart in FIG. 6, the module A outputs, onto the bus, an address allocated to the module C and a command for specifying a burst write transfer (A/D-1 corresponds to the data outputting line 311 in FIG. 3, and the timing is presented by 602 in FIG. 6) (1102). Here, by using the address-valid (ADV-N) signal 603, it is specified that the transfer is an address/command cycle. The module C receives the burst write access request through the bus signal lines (1008, 1011, 1012 and 1013 in FIG. 10) by way of the bus module 108. Then, the module C sends the acknowledge (ACK-N) signal 606, i.e., a report of the reception of the access request, to the module A by way of the bus module 108 (1103).

At the same time, using a buffer-full (BFL-N) signal 607, the module C informs the module A of an empty state of a transfer accepting buffer within the module C (1104). FIG. 6 illustrates a timing chart associated with a burst write, where the buffer within the module C has a free or available space, and, therefore, can accept a data transfer for the burst write. In this case, the crossbar switch controlling unit 210 in FIG. 3 controls: the selectors 324, 322, and 327 to transfer data through the data outputting line 311; the bypass line 320 which circumvents the transferring buffer 302 disposed in the transfer path within the bus module; and the data inputting line 316 (1105).

On the other hand, FIG. 7 illustrates a timing chart associated with a burst write, where the module C does not have any free space within its internal buffer, and, therefore, cannot accept any data transfer for the burst write. Upon receipt of a burst write request through associated bus signal lines (1008, 1011, 1012, 1013 in FIG. 10), the module C transmits an acknowledge (ACK-N) signal 706, indicating that it has received the burst write access request, to the module A through the bus module 108, and simultaneously notifies the module A, using a buffer full (BFL-N) signal 707, that the transfer accepting buffer within the module C cannot accept any transfer (1106).

Then, in this event, the crossbar switch controlling unit 210 in FIG. 3 controls: the selectors 324, 322, and 327 to transfer data through the data outputting line 311; the transferring buffer 302 disposed in the transfer path within the bus module; and the data inputting line 316. Here, the data is written into the transferring buffer 302 at the timing of an address/data signal (A/D-1) 702. Then, after the buffer full (BFL-N) signal 707 is negated (1107), the data is written into the module C by the bus module 108 at the timing of an address/data signal (A/D-2) 708 (1108). FIG. 11 illustrates a sequence of the operations described above in flow chart form.

Now, a comparison will be made between a bus configuration having a commonly available transferring buffer as described above and a bus configuration without such a transferring buffer. FIG. 4 illustrates a bus configuration without a transferring buffer. Specifically, FIG. 4 illustrates a bus configuration using a crossbar switch, and flows of data within the bus module 108 in an on-chip based system LSI.

In FIG. 4, consider that a module A performs a burst write (over four data cycles) into a module C. As illustrated in the timing chart of FIG. 8, the module A outputs a command for specifying an address in the module C, and a burst write. Here, the module A specifies an address/command cycle with an address valid (ADV-N) signal 803. Upon receipt of a burst write access request from the bus module 108 through a bus control signal, the module C transmits an acknowledge (ACK-N) signal 806, indicating that it has received the burst write access request, to the module A through the bus module 108.

Figure 8:
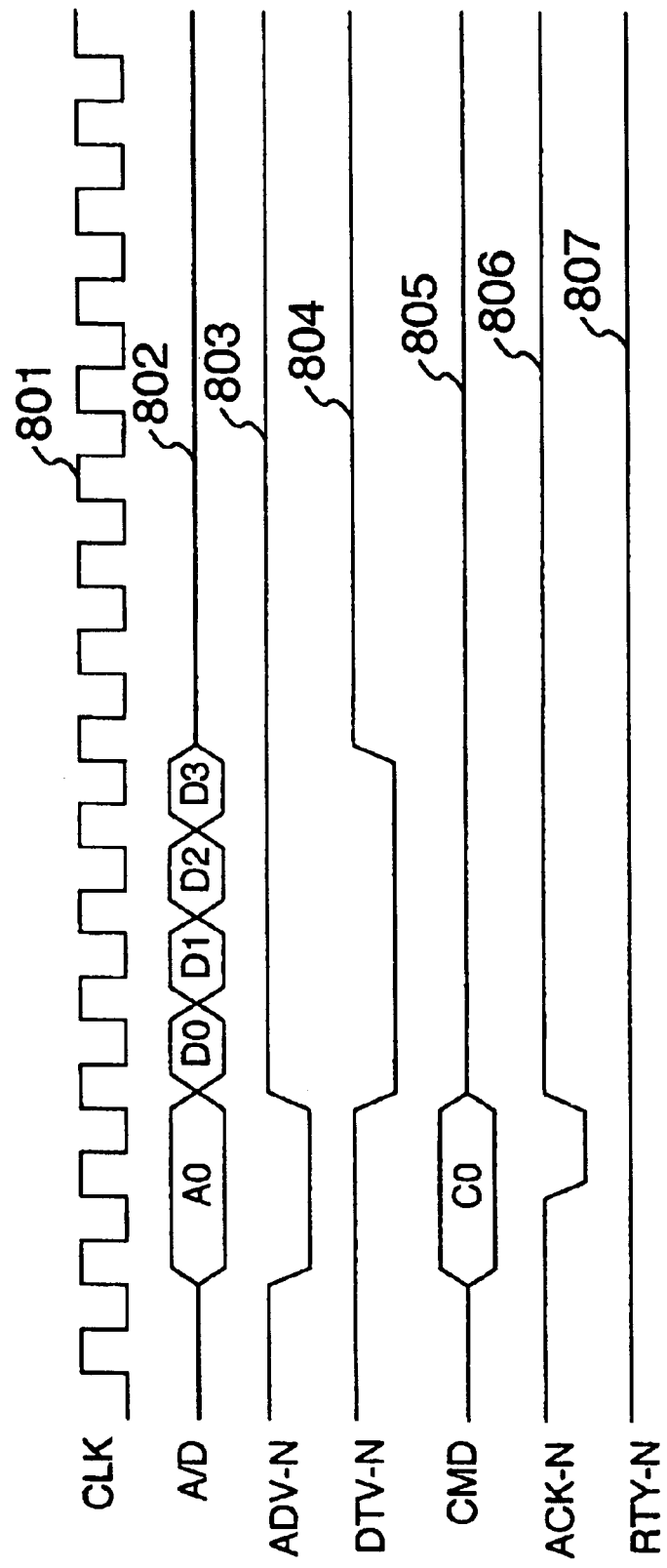
FIG. 8 is a timing chart for a burst write on the on-chip bus according to the conventional example (with the receiving side buffer in an empty state)

FIG. 8 illustrates a timing chart associated with a burst write, where the module C has a free space in its internal buffer, and, therefore, can accept an access request for the burst write. In this event, the crossbar switch controlling unit 210 in FIG. 4 controls selectors (for example, 405, 411) to establish a path for enabling a data transfer through the data outputting line 311 and the data inputting line 316. On the other hand, FIG. 9 illustrates a timing chart associated with a burst write, where the module C does not have any free space in its internal buffer, and, therefore, cannot accept an access request for the burst write.

Figure 9:
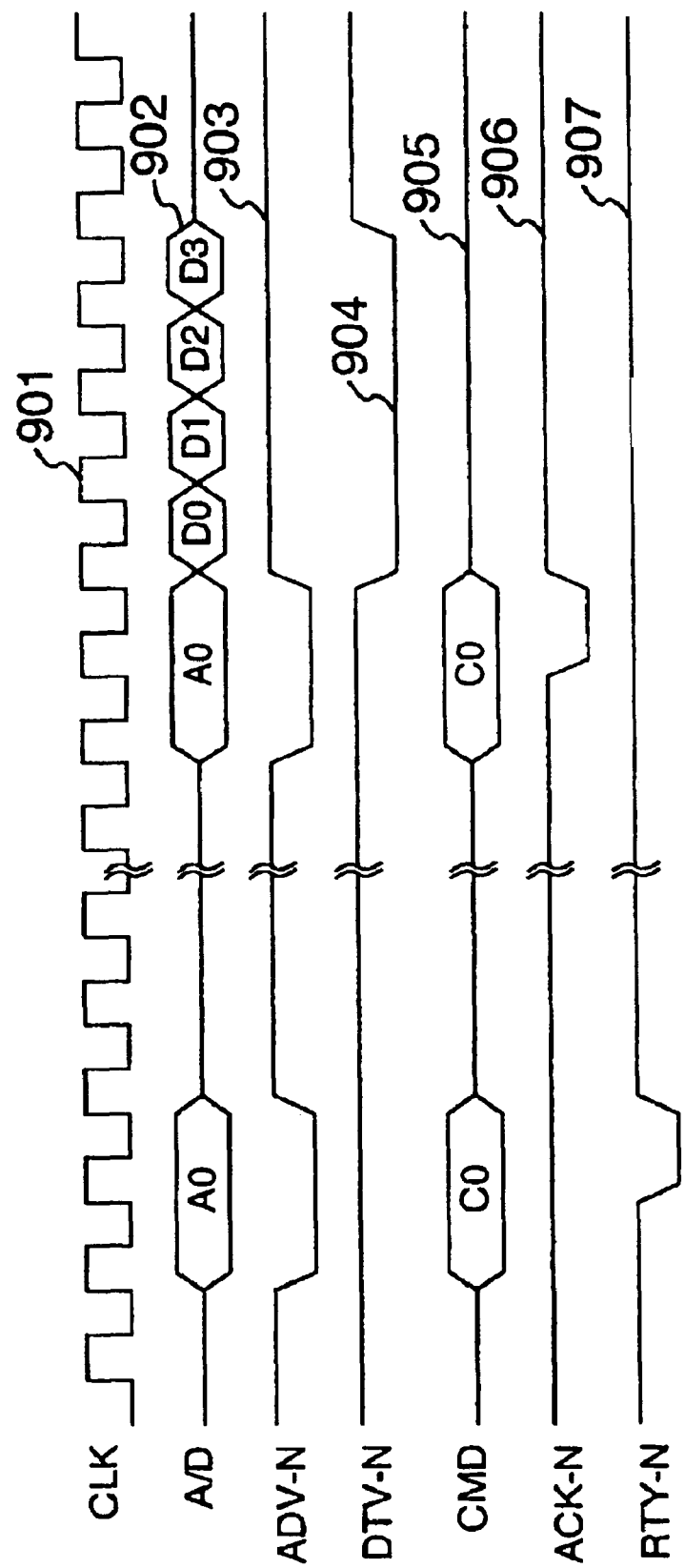
FIG. 9 is a timing chart for a burst write on the on-chip bus according to the conventional example (with the receiving side buffer in a full state)

As illustrated in the timing chart of FIG. 9, the module A outputs a command for specifying an address in the module C, and a burst write (1202, 1203). Here, the module A specifies an address/command cycle with an address valid (ADV-N) signal 903. Upon receipt of a burst write access request from the bus module 108 through a bus control signal, the module C notifies the module A, using a retry request signal (RTY-N) 907, that the module C does not have any free space in its internal buffer so that it cannot accept the burst write access request (1204). The module A, which has had its request for transfer rejected by the retry request, again attempts to request a transfer after a certain period of time (1206).

At the time the module C eventually has a free space in its internal buffer and responds to the module A with an acknowledge (ACK-N) 906, indicating that it has received the burst write access request, the crossbar switch controlling unit 210 in FIG. 4 controls the bus by controlling the selectors 405, 411 to establish a data path for transferring data through the data outputting line 311 and the data inputting line 316, before executing a data transfer to the module C (1205). FIG. 12 illustrates a sequence of the operations described above in flow chart form.

With a conventional bus installed on a printed circuit board, bus lines per se are mere wires on the board. Therefore, the provision of buffers, just as those of the present invention, in the bus means addition of extra LSI parts to the bus. Generally, for providing such buffers as those of the present invention, the buffers are contained in bus interface units (on the reception side) of all modules connected to the bus. As a result, the conventional bus on the board suffers from an increase in the number of gates in the modules.

In contrast, when bus lines are configured into a bus module such as 108 in the present invention and a commonly available buffer is provided in the bus module, addition of unnecessary buffers can be avoided. This is because all modules rarely transfer data simultaneously, so that only an amount of buffers appropriate to a bus use rate may be provided in the bus module 108 (for example, when the use rate is 50%, a required capacity of buffers is only one-half of the capacity which would be needed when buffers are provided in all modules).

While this embodiment has shown the bus configuration in the form a crossbar switch, the bus configuration may, of course, be implemented as a normal bus form in which common bus lines are used in a time division manner.

According to the present invention, even if a buffer in a slave module, which is the destination, is full, and, hence, cannot receive any more data transferred thereto, a bus master can transfer data to the transferring buffer provided on the on-chip bus on the LSI. Thus, the bus master or the source need not delay a transfer, irrespective of whether or not the internal buffer in the slave has a free space, thereby improving the processing performance of the overall system.

It should be noted that the present invention is also effective in improving the LSI frequency. Specifically, due to an increase in wire capacity in LSIs resulting from the significant and on-going miniaturization of LSI processes in recent years, delays caused by wires becomes more problematic than delays caused by gates. In particular, a transfer between modules positioned at diagonally opposing corners of a chip is highly likely to form a critical path of the entire chip (in this case, because the length of wire is approximately twice the length of one side of the chip).

To solve this problem, the bus module 108 may be installed in a central portion of a chip such that data is once relayed by a buffer contained in the bus module 108, whereby the length of wire between diagonally opposing modules can be reduced to approximately one half. In this way, the present invention can be utilized as a countermeasure to the critical path problem. Stated another way, the present invention is effective also in view of achieving an improvement in frequency.

In addition, as compared with a conventional bus installed on a printed circuit board, a buffer provided on an on-chip bus using the present invention results in a shorter length of wires, so that delays caused by wires can be reduced.

It will be understood that different components may be used within the information processing apparatus of FIG. 1 depending on particular products to which it is applied. Typical examples of applications include a set top box (STB) for cable TV and satellite broadcasting, a compact mobile terminal, a terminal dedicated to the Internet, and so on. The STB would require an MPEG decoder, a TV output mechanism and so on, as possible modules contained in the system LSI 101, in addition to a DRAM, a DMA (direct memory access) controller and basic I/O. On the system bus 109, a cable modem or a satellite tuner may be required as a communications module in addition to the ROM and main storage device.

Furthermore, it is contemplated that a printer interface, a hard disk drive and so on can be optionally provided on the I/O bus 110. A compact mobile terminal, on the other hand, would require an LCD (liquid crystal display) controller with an accelerator, as a possible module contained in the system LSI 101, in addition to a DRAM, a DMA (direct memory access) controller and basic I/O. On the system bus 109, a modem, a PC card interface, an FD (flexible disk) interface, and so on may be required in addition to the ROM and main storage device. In some cases, the I/O bus 110 may be eliminated for reducing the size.

A dedicated Internet terminal may require a graphics controller with an accelerator, as a possible module contained in the system LSI 101, in addition to the DRAM, DMA (direct memory access) controller and basic I/O. On the system bus 109, an Ethernet (for business use) or modem (for family use) interface will be required as a communications module, in addition to the ROM and main storage device. Moreover, a printer interface, a hard disk drive and so on may be provided on the I/O bus 110.

It is also contemplated that a common buffer is provided on a printed circuit board within the scope of the present invention.

Figure 13:
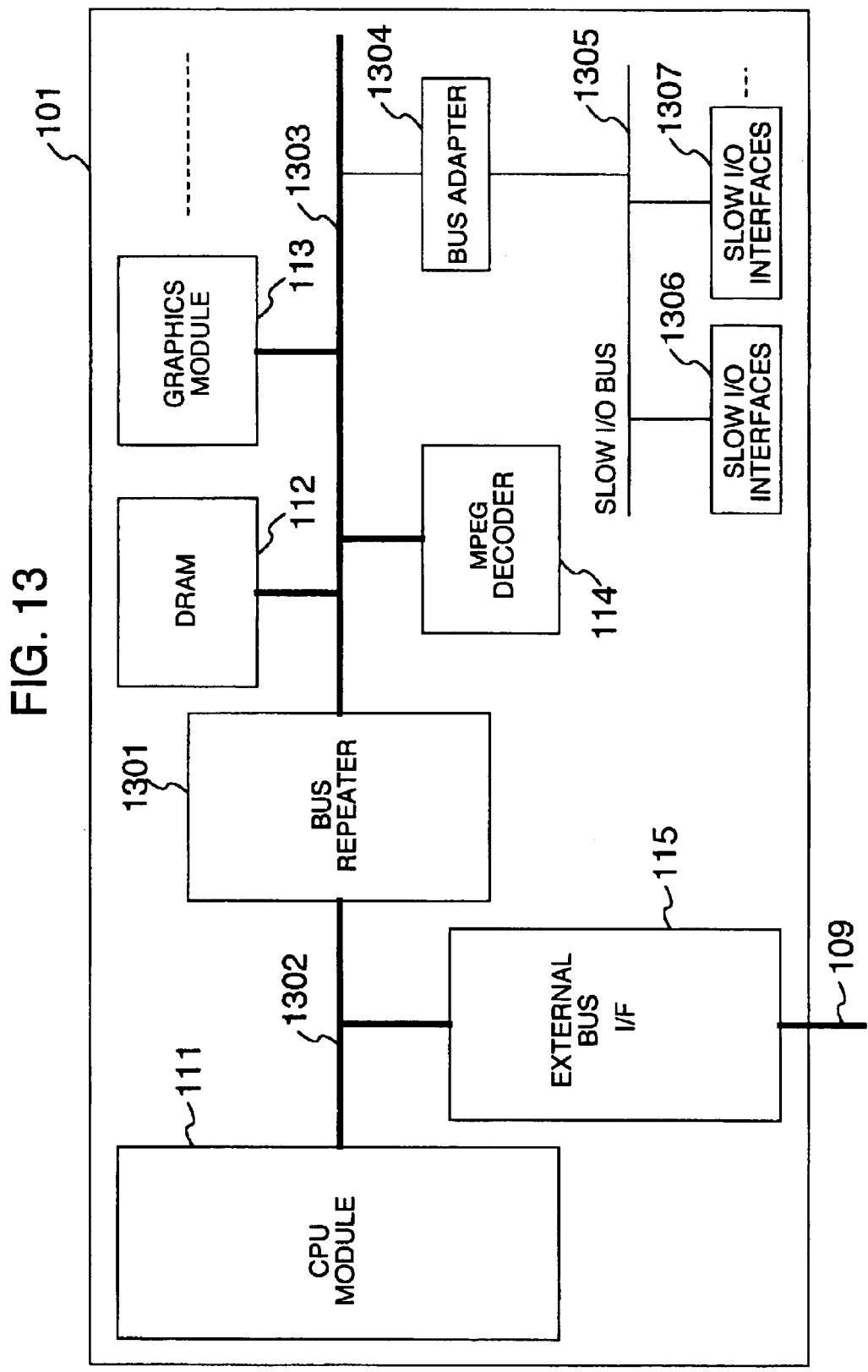
FIG. 13 is a block diagram for illustrating a hierarchical structure of an internal bus according to an embodiment of the present invention.
Figure 14:
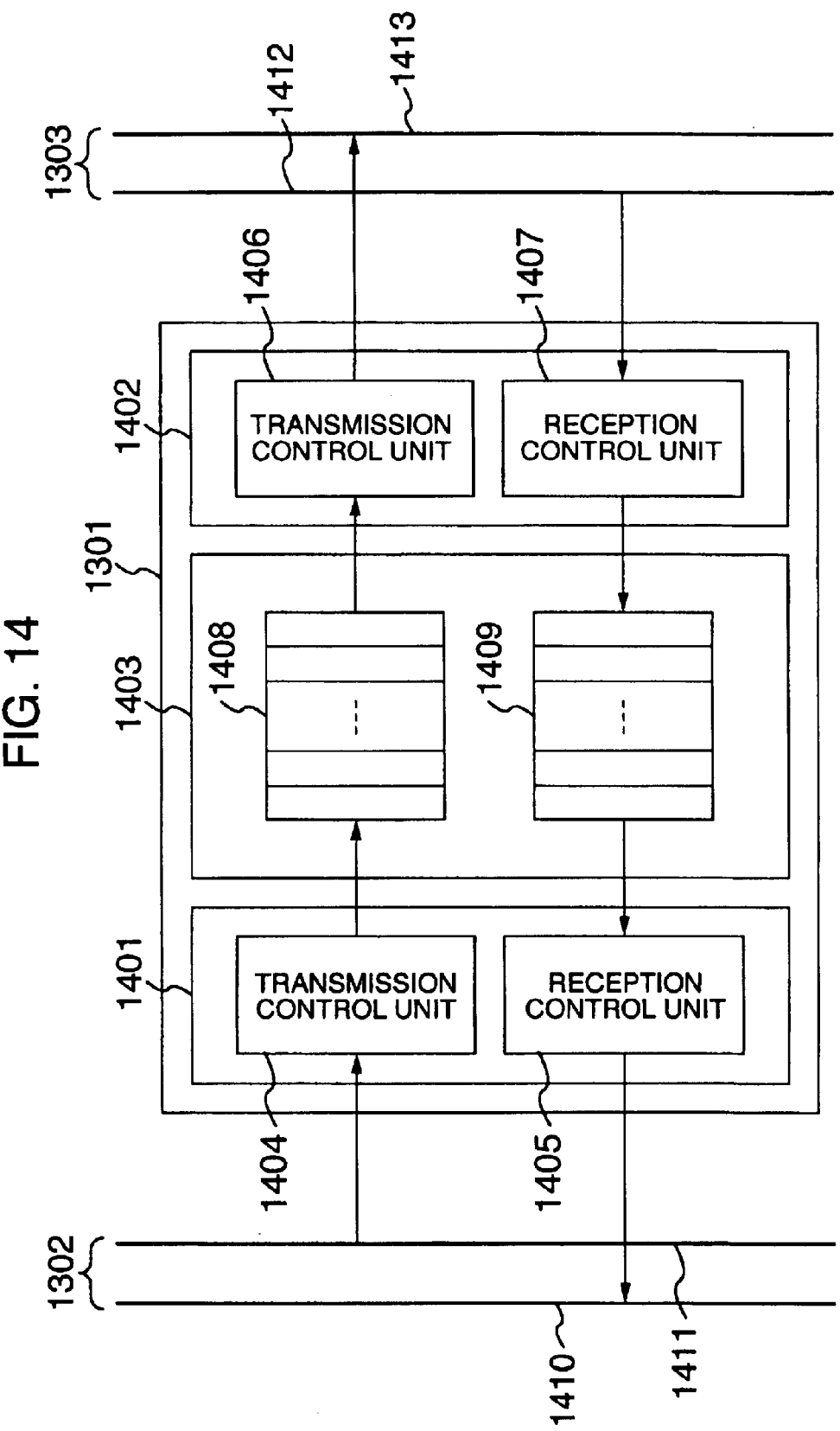
FIG. 14 is a block diagram for illustrating an internal structure of a bus repeater according to the present invention.

FIG. 13 is a block diagram illustrating the hierarchical structure of an internal bus in an embodiment of the present invention. FIG. 14 is a block diagram illustrating the internal configuration of a bus repeater in FIG. 13. The internal bus illustrated in FIG. 13 comprises: a bus repeater 1301 for separating an on-chip bus 108, as illustrated in FIG. 1, into two; an on-chip bus 1302, which is one of the two on-chip buses separated by the bus repeater 1301, including a CPU module 111 and an external bus interface 115; an on-chip bus 1303, which is the other one of the two on-chip buses, separated by the bus repeater 1301, that does not include the CPU module 111 and the external bus interface 115; a bus adaptor 1304 for interconnecting the on-chip bus 1303 and an on-chip low speed I/O bus 1305; the on-chip low speed I/O bus 1305; and low speed I/O interfaces 1306, 1307. Turning next to FIG. 14, the bus repeater 1301 comprises: an interface 1401 to the on-hip bus 1302; an interface 1402 to the on-chip bus 1303; a transferring buffer unit 1403; a transfer reception controlling unit 1404 for receiving a transfer from the on-chip bus 1302; a transfer transmission controlling unit 1405 for transmitting a transfer to the on-chip bus 1302; a transfer transmission controlling unit 1406 for transmitting a transfer to the on-chip bus 1303; a transfer reception controlling unit 1407 for receiving a transfer from the on-chip bus 1303; a transferring buffer 1408 for use in a transfer from the on-chip bus 1302 to the on-chip bus 1303 (including address, data and transfer control information); a transferring buffer 1409 for use in a transfer from the on-chip bus 1303 to the on-chip bus 1302 (including address, data and transfer control information); an inputting line 1410 from the on-chip bus 1302 to the bus repeater 1301; an outputting line 1411 from the bus repeater 1301 to the on-chip bus 1302; an inputting line 1412 from the on-chip bus 1303 to the bus repeater 1301; and an outputting line 1413 from the bus repeater 1301 to the on-chip bus 1303.

Consider now a method of further improving the operating frequency of the system LSI according to the present invention. A critical factor which impedes an improved operating frequency of an LSI is the number of modules connected on a bus. A smaller number of modules connected on a bus provides for a reduced delay due to wiring, and a smaller scale of crossbar switch logic, and, consequently, the operating frequency can be improved. Thus, it is contemplated that an on-chip bus is separated into two or more sections using a bus repeater(s) to locally improve the frequency. For example, an on-chip bus having eight modules connected thereto and operating at 100 MHz is separated into two bus sections which have two modules and six modules, respectively, using a bus repeater. In this way, the on-chip bus having two modules is actually loaded with three modules including the bus repeater, while the on-chip bus having six modules is loaded with seven modules. The on-chip bus loaded with six modules does not benefit much from the separation because its operating condition does not improve significantly, whereas the on-chip bus loaded with two modules can improve the frequency corresponding to a reduction in the number of modules connected thereto. However, as a matter of course, when data is transferred from the on-chip bus having two modules to the on-chip bus having six modules, an overhead per transfer is increased, and a larger latency occurs. It is therefore necessary to allocate modules to the respective separated on-chip buses with careful attention.

In FIG. 13, a bus repeater is employed to separate the main on-chip bus into two sections (on-chip buses 1302, 1303). In addition, the on-chip bus 1302 is allocated only the CPU module 111 and the external bus interface 115, while the remaining functional modules are all connected to the on-chip bus 1303. In this configuration, since the on-chip bus 1302 is charged only with three modules, including the bus repeater, the frequency can be locally improved on the on-chip bus 1302, as compared with the single on-chip bus which is not separated into two. Specifically, a transfer between the CPU and an external memory can be faster, with a resulting improvement in the processing performance of the entire system. On the other hand, this configuration implies a problem that a transfer between the CPU or an external memory and a module on the on-chip bus 1303 will experience a larger transfer latency. However, the performance required for a transfer to a peripheral functional module is often lower than that for a transfer between the CPU and the main memory. In addition, many systems have a larger proportion of transfers between the CPU and the main memory. Taking into account these facts, the separation of the on-chip bus into appropriate sections, as described above, can improve the performance of the entire system in many cases. Generally, the ratio of the frequency selected for the on-chip bus 1302 to the frequency selected for the on-chip bus 1303 may be an integer ratio such as 1:1, 2:1, 4:1, or the like in order to reduce a loss associated with the synchronization in the bus repeater. Furthermore, for a low performance I/O device, a slow I/O bus 1305 or the like may be provided such that the low performance I/O device may be connected to the on-chip bus 1302 through the slow I/O bus 1305 and a bus adapter. The internal configuration of the bus repeater is illustrated in FIG. 14.

According to the present invention, even if a buffer within a slave module, specified as the destination, is fully loaded and cannot accept any more transfers of data, a bus master can transfer data to the transferring buffer provided on the on-chip bus of the LSI. This can result in a reduction in time for which the bus master occupies the bus in one information transfer, and an efficient use of the bus. Also, the bus master or the source need not delay a transfer due to a busy bus, even though the buffer within the slave has a free space, thereby improving the processing performance of the entire system. As a further advantage of the present invention, the performance of the entire system can be further improved by separating the on-chip bus into two or more sections using a bus repeater(s) to locally improve the frequency.

What is claimed is:

1. An integrated circuit comprising:
   a plurality of functional modules;
   a bus comprising a crossbar switch interconnecting each of said plurality of functional modules; and
   a common buffer disposed on said bus to store transfer information transferred from at least one source module to at least one destination module among said plurality of functional modules, wherein said common buffer is set in a buffering enabled state or a buffering disabled state dependent on whether or not a buffer in said destination module can accept said transfer information; and
   means for selecting a path for transferring said transfer information to said destination module when a signal from said destination module indicates that said buffer within said destination module can accept said transfer information, and selecting a transfer path for storing said transfer information in said common buffer when the signal indicates that the buffer within said destination module cannot accept said transfer information,
   wherein said common buffer on said bus is disposed in a vicinity of each of said plurality of functional modules.

2. An integrated circuit according to claim 1, further comprising a signal line to transfer said transfer information to the buffer within said destination module when said buffer can accept said transfer information, said signal line circumventing said common buffer.

3. An integrated circuit according to claim 1, wherein said destination module comprises an information receiving buffer to receive information from said common buffer, and wherein, when said information receiving buffer cannot accept said transfer information, information indicating that no transfer can be permitted is communicated from said destination module to said source module.

4. An integrated circuit according to claim 1, wherein said crossbar switch comprising said common buffer is disposed on a position facing to each of said plurality of functional modules and is connected thereto.

5. An integrated circuit according to claim 1, wherein said crossbar switch comprising said common buffer is disposed on a nearest position to each of said plurality of modules and is connected thereto.

6. An integrated circuit according to claim 1, wherein said crossbar switch comprising said common buffer is disposed in a neighborhood of a central portion of said integrated circuit and is connected thereto.

7. An integrated circuit according to claim 1, wherein said crossbar switch comprises a plurality of selectors, and wherein each signal inputted from each of said plurality of modules is connected to said common buffer via said selector comprising said crossbar switch.

8. An integrated circuit according to claim 7, wherein each signal outputted from said common buffer is outputted to each of said plurality of modules via an another selector comprising said crossbar switch.

9. An integrated circuit according to claim 1, wherein said crossbar switch comprises:
   a first crossbar switch unit to select any one of each of signals outputted from each of said plurality of modules;
   a second crossbar switch unit to select either one a signal outputted from said common buffer or a signal outputted from said crossbar switch unit; and
   a third crossbar switch unit to select an output destination of said plurality of modules.

10. An integrated circuit comprising:
    a bus comprising a crossbar switch interconnecting each of a plurality of functional modules, wherein said bus transmits transfer information from a source module to a destination module among said plurality of functional modules;
    a controlling unit to select a transfer path depending on whether or not a buffer in said destination module can accept said transfer information;
    a common buffer to store said transfer information transferred between said plurality of functional modules in accordance with the result of a selection made by said controlling unit when said buffer on said destination module cannot accept said transfer information; and
    transfer path controlling means, including a plurality of common bus interfaces, for controlling input/output between said plurality of functional modules and said common buffers.

11. An integrated circuit comprising:
    a CPU module;
    a first bus connected to an external memory interface module;
    a second bus connected to a plurality of functional modules; and
    a bus adapter to connect between said first bus and said second bus,
    wherein said first bus comprises a crossbar switch interconnecting each of said CPU module, said external interface module, said plurality of functional modules and said bus adapter, and wherein said integrated circuit further comprises:

a control unit to select a transferring path for transferring transfer information from a source module to a destination module in any of said CPU module, said external interface module, and said functional modules depending on whether said destination module can accept said transfer information;

a common buffer to store said transfer information depending on a result selected by said control unit when a buffer in said destination module cannot accept said transfer information; and transfer path control means, comprising a plurality of common bus interfaces, for controlling input or output between said plurality of functional modules and said buffer.

12. An integrated circuit according to claim 11, wherein said first bus employs a protocol identical to a protocol employed by said second bus.

13. An integrated circuit according to claim 12, wherein an operating frequency of said first bus is an integer multiple of an operating frequency of said second bus.

* * * * *